(12) United States Patent
Kamezaki et al.

(10) Patent No.: US 11,978,022 B2
(45) Date of Patent: May 7, 2024

(54) MEETING MANAGEMENT APPARATUS, MEETING MANAGEMENT METHOD, AND MEETING MANAGEMENT SYSTEM

(71) Applicant: V-CUBE, INC., Tokyo (JP)

(72) Inventors: Yosuke Kamezaki, Tokyo (JP); Hironori Nurishi, Tokyo (JP); Ei Sou, Tokyo (JP); Ken Koseki, Tokyo (JP)

(73) Assignee: V-CUBE, INC., Tokyo (JP)

( * ) Notice: Subject to any disclaimer, the term of this patent is extended or adjusted under 35 U.S.C. 154(b) by 0 days.

(21) Appl. No.: 18/299,057

(22) Filed: Apr. 12, 2023

(65) Prior Publication Data

US 2023/0244433 A1 Aug. 3, 2023

Related U.S. Application Data

(63) Continuation of application No. PCT/JP2021/033507, filed on Sep. 13, 2021.

(30) Foreign Application Priority Data

Oct. 26, 2020 (JP) .................. 2020-178880

(51) Int. Cl.
*G06Q 10/1093* (2023.01)
*G06F 3/14* (2006.01)

(52) U.S. Cl.
CPC ........... *G06Q 10/1095* (2013.01); *G06F 3/14* (2013.01)

(58) Field of Classification Search
CPC .................................................. G06Q 10/1095
See application file for complete search history.

(56) References Cited

U.S. PATENT DOCUMENTS

| | | | | |
|---|---|---|---|---|
| 5,323,314 A * | 6/1994 | Baber | ........... | G06Q 10/109 715/846 |
| 7,679,518 B1 * | 3/2010 | Pabla | ........... | G06Q 10/109 709/204 |
| 8,352,296 B2 * | 1/2013 | Taneja | ........... | G06Q 50/188 709/225 |
| 9,652,113 B1 * | 5/2017 | Colson | ........... | G06Q 10/1095 |
| 9,723,242 B1 | 8/2017 | Fulay et al. | | |
| 10,319,015 B2 * | 6/2019 | Ogawa | ........... | G06Q 10/02 |
| 11,138,980 B2 * | 10/2021 | Yoshioka | ........... | G10L 15/30 |
| 11,336,706 B1 * | 5/2022 | Saito | ........... | H04L 65/403 |
| 2009/0310601 A1 | 12/2009 | Kawahata | | |
| 2011/0295392 A1 * | 12/2011 | Cunnington | ........... | G06Q 10/10 702/19 |

(Continued)

FOREIGN PATENT DOCUMENTS

| | | |
|---|---|---|
| JP | 2006302047 A | 11/2006 |
| JP | 200786935 A | 4/2007 |

(Continued)

*Primary Examiner* — Asher D Kells
(74) *Attorney, Agent, or Firm* — HAUPTMAN HAM, LLP

(57) ABSTRACT

A meeting management apparatus manages a plurality of group meeting that a plurality of attendees can attend using an attendee terminal. The meeting management apparatus includes: a data acquiring part that acquires state data indicating a state of each of the plurality of group meetings; and a terminal control part that transmits, to the attendee terminal, state data corresponding to each of the plurality of group meetings in association with meeting identification information for identifying each of the plurality of group meetings.

13 Claims, 10 Drawing Sheets

(56) References Cited

U.S. PATENT DOCUMENTS

| | | | |
|---|---|---|---|
| 2014/0149519 A1* | 5/2014 | Redfern | H04L 51/222 |
| | | | 709/204 |
| 2014/0317647 A1 | 10/2014 | Itakura | |
| 2016/0275952 A1* | 9/2016 | Kashtan | H04M 3/569 |
| 2017/0357915 A1* | 12/2017 | Holmes | G06F 3/0484 |
| 2018/0330736 A1* | 11/2018 | Faulkner | G10L 17/00 |
| 2019/0108492 A1* | 4/2019 | Nelson | G06F 40/186 |
| 2019/0108493 A1* | 4/2019 | Nelson | G06Q 10/1095 |
| 2019/0236554 A1* | 8/2019 | Hill | G06Q 10/06 |
| 2020/0104760 A1* | 4/2020 | Hashimoto | G06Q 10/107 |
| 2020/0104804 A1* | 4/2020 | Fujimura | G06Q 10/1095 |
| 2020/0160243 A1* | 5/2020 | Tomosugi | G06Q 10/06311 |
| 2021/0012249 A1* | 1/2021 | Saito | G06Q 10/1095 |
| 2021/0055905 A1* | 2/2021 | Moldover | H04N 21/41407 |
| 2021/0065695 A1* | 3/2021 | Motosugi | G06F 40/129 |
| 2021/0258427 A1* | 8/2021 | Lee | H04L 12/1831 |
| 2021/0295217 A1* | 9/2021 | Nagahara | G06F 16/904 |
| 2021/0357878 A1* | 11/2021 | Suzuki | G06Q 10/1095 |
| 2021/0392201 A1* | 12/2021 | Suzuki | H04L 67/62 |
| 2022/0019472 A1* | 1/2022 | Norota | G06Q 10/109 |
| 2022/0058553 A1* | 2/2022 | Stewart | G06V 20/00 |
| 2023/0007063 A1* | 1/2023 | Gupta | H04L 65/1069 |
| 2023/0216699 A1* | 7/2023 | Raghavan | G10L 25/78 |
| | | | 709/204 |

FOREIGN PATENT DOCUMENTS

| | | | |
|---|---|---|---|
| JP | 2009232054 A | 10/2009 | |
| JP | 2009302806 A | 12/2009 | |
| JP | 2017201479 A | 11/2017 | |
| JP | 2020144476 A | 9/2020 | |
| WO | 2013061389 A1 | 5/2013 | |

* cited by examiner

| ATTENDEE ID | NAME | ATTRIBUTES | | ATTENDING MEETING ID | STATE DATA TRANSMISSION ALLOWABILITY |
|---|---|---|---|---|---|
| | | OCCUPATION | FIELD OF INTEREST | | |
| U0001 | Taro Yokota | researcher | robots | B4 | ○ |
| U0002 | Hanako Suzuki | engineer | communication | B2 | ○ |
| U0003 | Hiroshi Nakata | sales | electric devices | B1 | ○ |
| U0004 | IchiroTanaka | tax accountant | nothing in particular | B4 | ○ |
| U0005 | Jiro Sato | consultant | robots | B4 | ○ |
| U0006 | Keiko Taniguchi | sales | software | B3 | × |
| U0007 | Tomo Takita | teacher | electricity | B1 | ○ |
| ... | ... | ... | ... | ... | ... |

FIG. 6

| MEETING ID | ORGANIZER | SCHEDULE | ATTRIBUTES |
|---|---|---|---|
| B1 | ABC electric | introduction of electrical products | electrical equipment, communication |
| B2 | D systems | introduction of systems | systems, software |
| B3 | E communications | introduction of new services | communication |
| B4 | F robotics | introduction of application cases | robots, production |
| B5 | G device | technical description of devices | devices, semiconductors |
| B6 | H electric wire | introduction of new products | electric wires |
| ... | ... | ... | ... |

FIG. 7

MEETING MANAGEMENT APPARATUS, MEETING MANAGEMENT METHOD, AND MEETING MANAGEMENT SYSTEM

CROSS-REFERENCE TO RELATED APPLICATIONS

The present application is a continuation application of International Application number PCT/JP2021/033507, filed on Sep. 13, 2021, which claims priority under 35 U.S.C § 119(a) to Japanese Patent Application No. 2020-178880, filed on Oct. 26, 2020, contents of which are incorporated herein by reference in their entirety.

BACKGROUND OF THE INVENTION

The present disclosure relates to a meeting management apparatus, a meeting management method, and a meeting management system for managing meetings performed via a network.

There is known a technique for performing a meeting by transmitting and receiving audio signals via a network. Japanese Unexamined Patent Application Publication No. 2020-144476 discloses a meeting system that enables the performance of a plurality of group meetings.

In a venue such as a product exhibition, an attendee can view presentations given by various exhibitor companies by visiting exhibition booths of a plurality of companies. The attendee can view presentations given by exhibitor companies via a network by using a group meeting function of a meeting system.

However, when the attendee using a conventional meeting system views presentations given by exhibitor companies, the attendee can only grasp the content of one group meeting that he/she is attending, unlike a case where the attendee walks around an exhibition site. Therefore, the attendee has no way to take a look at group meetings that he/she is not attending, and unfortunately, the attendee may miss a group meeting that is worth attending for the attendee.

BRIEF SUMMARY OF THE INVENTION

The present disclosure has been made in view of these points, and its object is to make it easier for an attendee who is to attend a meeting via a network to grasp states of a plurality of group meetings.

A meeting management apparatus according to a first aspect of the present disclosure is a meeting management apparatus managing a plurality of group meetings that a plurality of attendees can attend using a communication terminal, the meeting management apparatus includes: a processor that functions as: a data acquiring part that acquires state data indicating a state of each of the plurality of group meetings; and a terminal control part that transmits, to the communication terminal, the state data corresponding to each of the plurality of group meetings in association with meeting identification information for identifying each of the plurality of group meetings.

A meeting management method according to a second aspect of the present disclosure is a meeting management method, executed by a computer, for managing a plurality of group meetings that a plurality of attendees can attend using a communication terminal, the meeting management method comprising the steps of: acquiring state data indicating a state of each of the plurality of group meetings; and transmitting, to the communication terminal, the state data corresponding to each of the plurality of group meetings in association with meeting identification information for identifying each of the plurality of group meetings.

A meeting management system according to a third aspect of the present disclosure is a meeting management system including: a plurality of communication terminals used by a plurality of attendees; and a meeting management apparatus managing a plurality of group meetings that the attendee can attend using the communication terminal, wherein the meeting management apparatus includes a processor that functions as: a data acquiring part that acquires state data indicating a state of each of the plurality of group meetings; a terminal control part that transmits, to the communication terminal, the state data corresponding to each of the plurality of group meetings in association with meeting identification information for identifying each of the plurality of group meetings, wherein the communication terminal includes a processor that functions as: a receiver that receives the state data; and a display that displays the state data received by the receiving part at a position corresponding to the group meeting according to the state data.

BRIEF DESCRIPTION OF THE DRAWINGS

FIG. 6 shows attendee management data.

FIG. 7 shows group meeting management data.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Outline of the Meeting Management System S]

Figure 1:
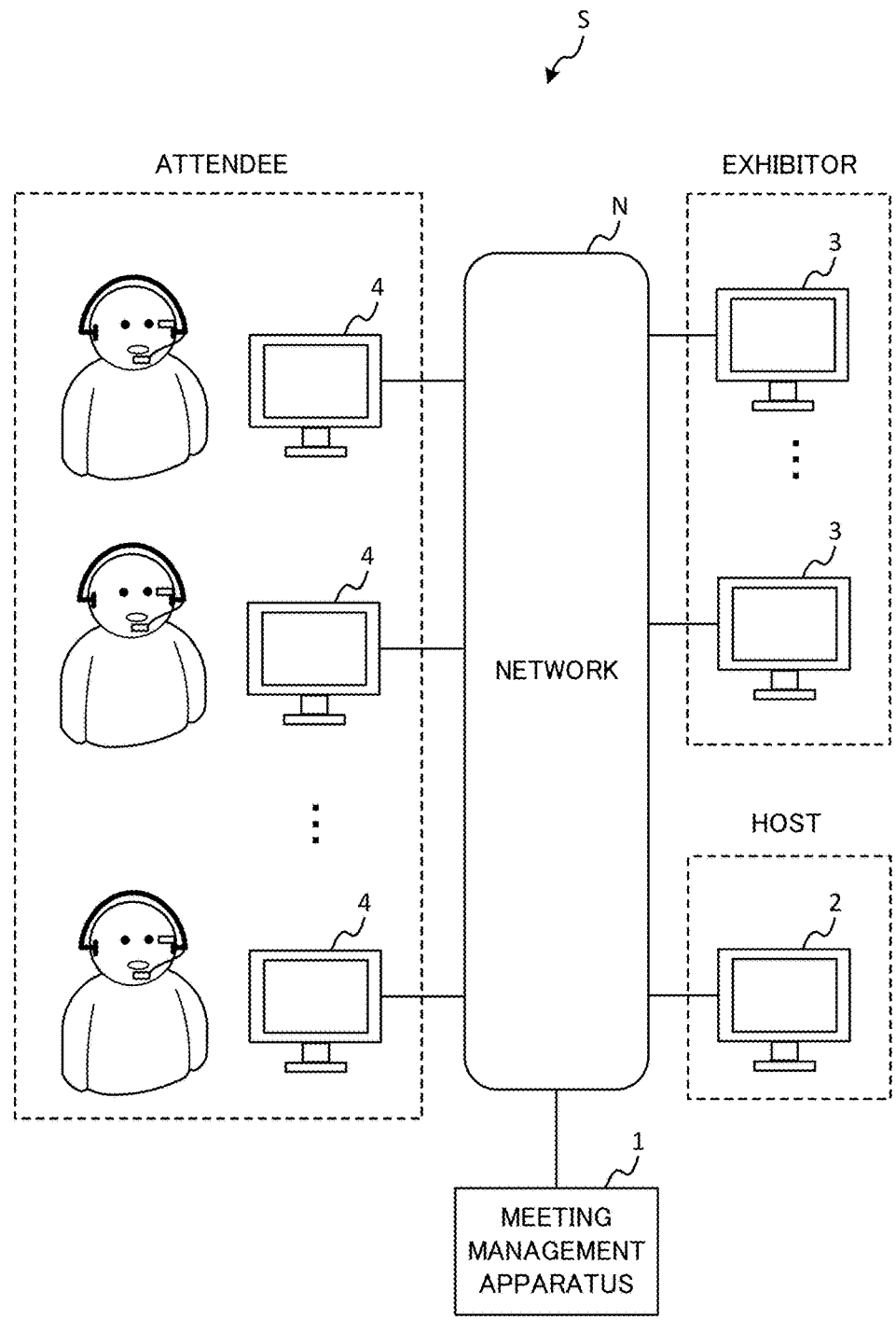
FIG. 1 shows a configuration of a meeting management system.

FIG. 1 shows a configuration of a meeting management system S. The meeting management system S is a system for enabling a plurality of group meetings to be performed online in parallel. The meeting management system S is suitable for an online event where people in charge of a plurality of exhibitor companies who wish to introduce their products or services and a plurality of attendees who wish to obtain information concerning products or services can exchange information, but the application of the meeting management system S is not limited.

In the example shown in FIG. 1, the meeting management system S includes a meeting management apparatus 1, a host terminal 2, a plurality of exhibitor terminals 3, and a plurality of attendee terminals 4. The meeting management apparatus 1 is a device for managing a plurality of group meetings that a plurality of attendees can attend using communication terminals. The meeting management apparatus 1 is a server that executes data processing for realizing a plurality of group meetings, and is managed by organizers (e.g., hosts of an event) of the plurality of group meetings, for example.

The meeting management apparatus 1 causes the plurality of exhibitor terminals 3 and the plurality of attendee terminals 4 to display a screen for attending the plurality of group meetings via a network N so that a plurality of people can attend the plurality of group meetings. The meeting management apparatus 1 provides an exhibitor terminal 3 and an attendee terminal 4 registered in advance with a web application, thereby allowing the exhibitor terminal 3 and the attendee terminal 4 to attend the group meeting. Details of the meeting management apparatus 1 will be described later.

The host terminal 2 is a communication terminal used by the organizers of the plurality of group meetings, and is, for example, a computer. An organizer performs various initial settings for the plurality of group meetings. For example, the organizer sets the number of people who can attend each group meeting, and sets the size of a booth corresponding to each group meeting in a layout diagram (map) of an event venue to be displayed on the plurality of exhibitor terminals 3 and the plurality of attendee terminals 4, via the host terminal 2.

The exhibitor terminal 3 is a communication terminal used by a person in charge of an exhibitor company that is to attend a group meeting (hereinafter referred to as "person in charge"), and is, for example, a computer, a tablet, or a smartphone. The exhibitor terminal 3 is disposed in an office of the exhibitor company, and is operated by one or more people in charge of the exhibitor company to transmit and receive various types of data to and from the attendee terminal 4 via the meeting management apparatus 1. The exhibitor terminal 3 transmits, to the meeting management apparatus 1, image data for a presentation, audio data of the person in charge, and text data input by the person in charge, for example.

The attendee terminal 4 is a communication terminal used by a visitor to an event who will attend a group meeting (hereinafter referred to as an "attendee"), and is, for example, a computer, a tablet, or a smartphone. The attendee terminal 4 is operated by the attendee to transmit and receive various types of data to and from the exhibitor terminal 3 via the meeting management apparatus 1. The attendee terminal 4 receives image data, audio data, and text data transmitted from the exhibitor terminal 3, and displays the received data on a screen.

The meeting management apparatus 1 generates various types of data for exchanging information between a plurality of people in charge and a plurality of attendees, and displays the generated, various types of data on screens of the exhibitor terminal 3 and the attendee terminal 4. The meeting management apparatus 1 displays an image indicating booths of the plurality of group meetings that can be attended using the plurality of attendee terminals 4 on the screen of the attendee terminal 4, and allows the attendee to select a group meeting that he/she wishes to attend. A group meeting in this embodiment corresponds to a booth in an event venue, and the attendee can attend a group meeting applied for previously or can shift to another group meeting by operating the attendee terminal 4.

A person in charge using the exhibitor terminal 3 and the attendee using the attendee terminal 4 can communicate with each other by sending and receiving text messages to and from each other using a chat feature or by individually sending and receiving voices. The attendee can send text messages to ask questions while the person in charge of the exhibitor company is giving a presentation in the group meeting, or can have voice conversation with the person in charge individually after the presentation, for example.

Examples of Screens

Figure 2:
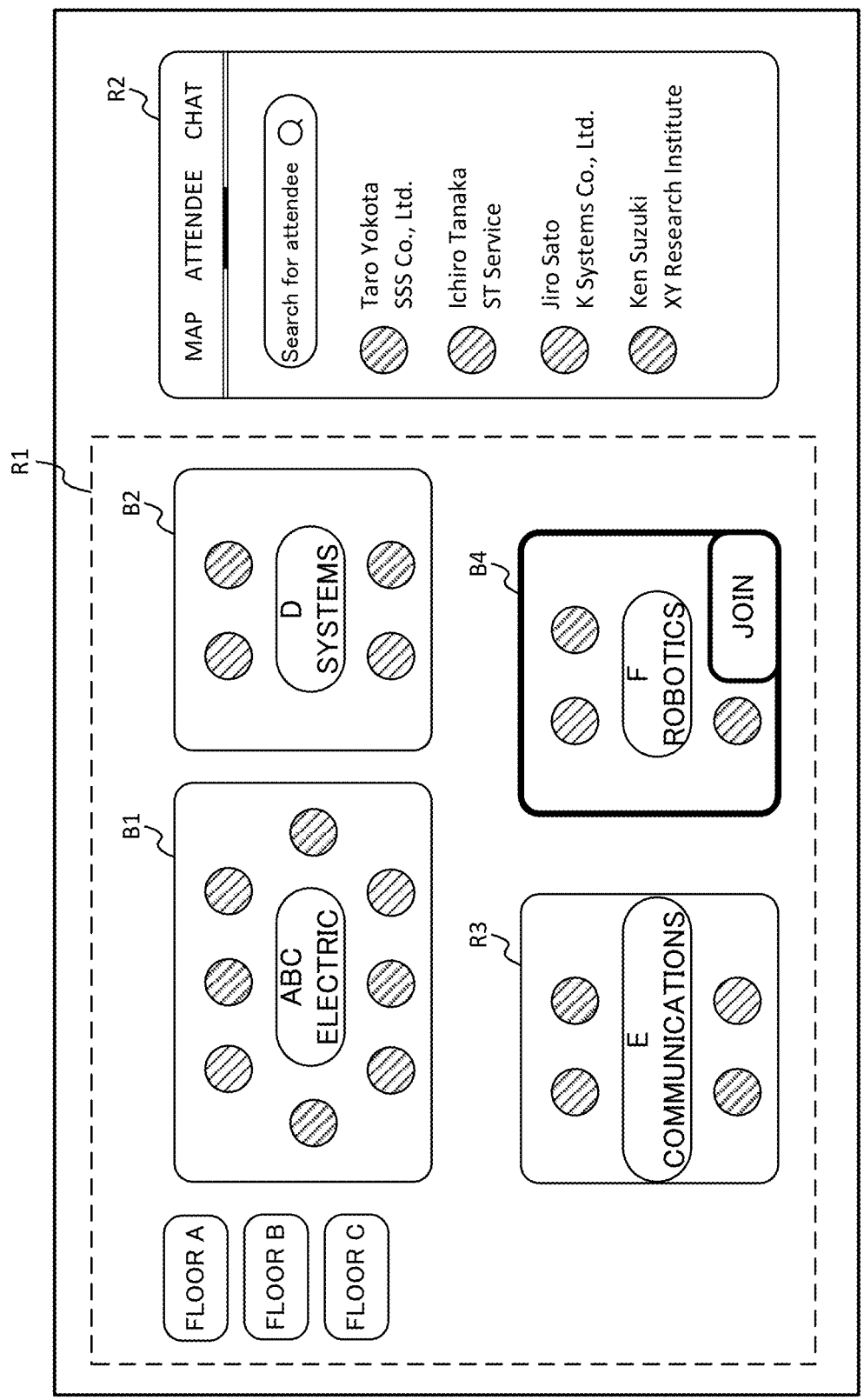
FIG. 2 shows a screen for selecting a group meeting that an attendee will attend.
Figure 3:
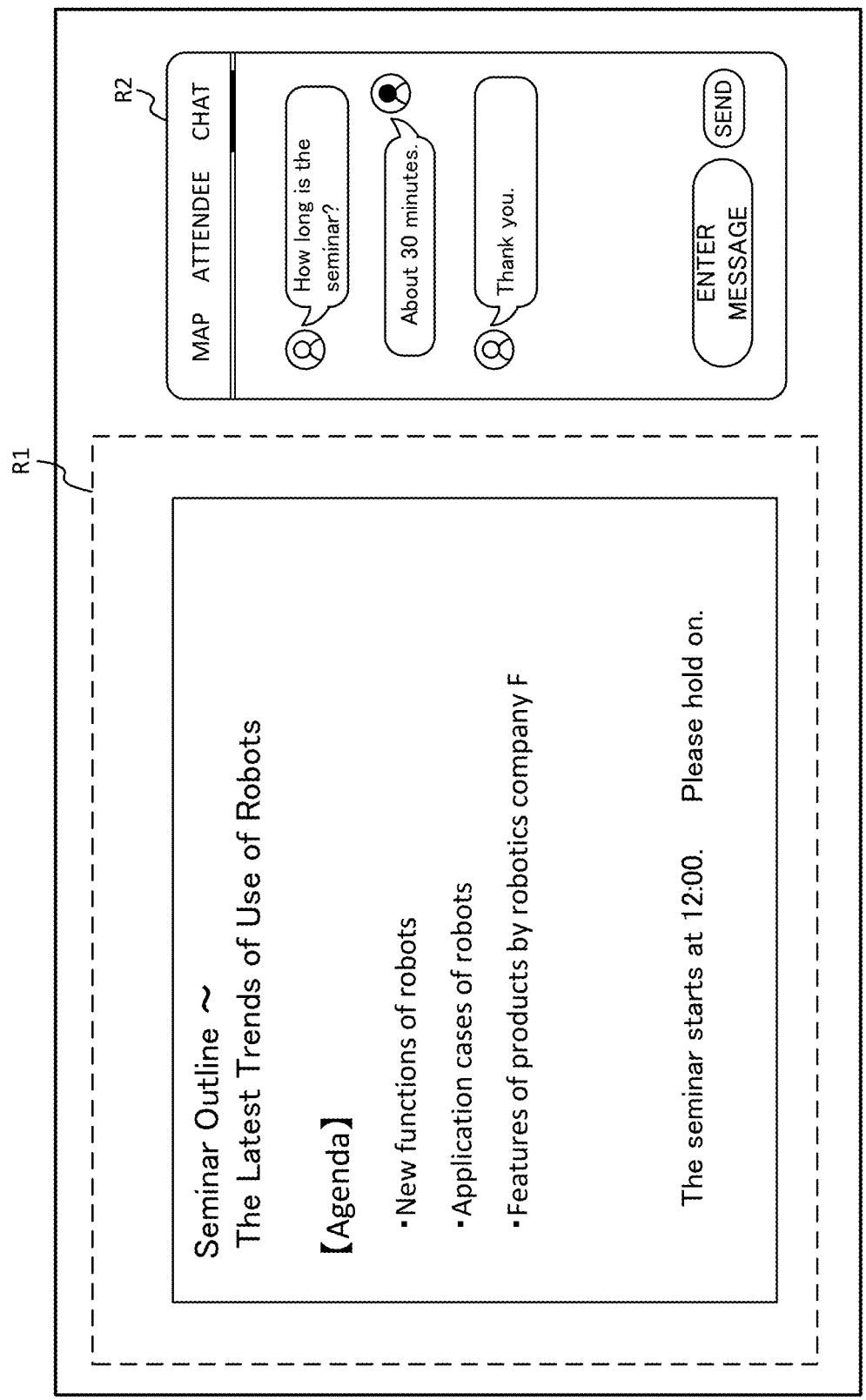
FIG. 3 shows an example of a screen in the group meeting.
Figure 4:
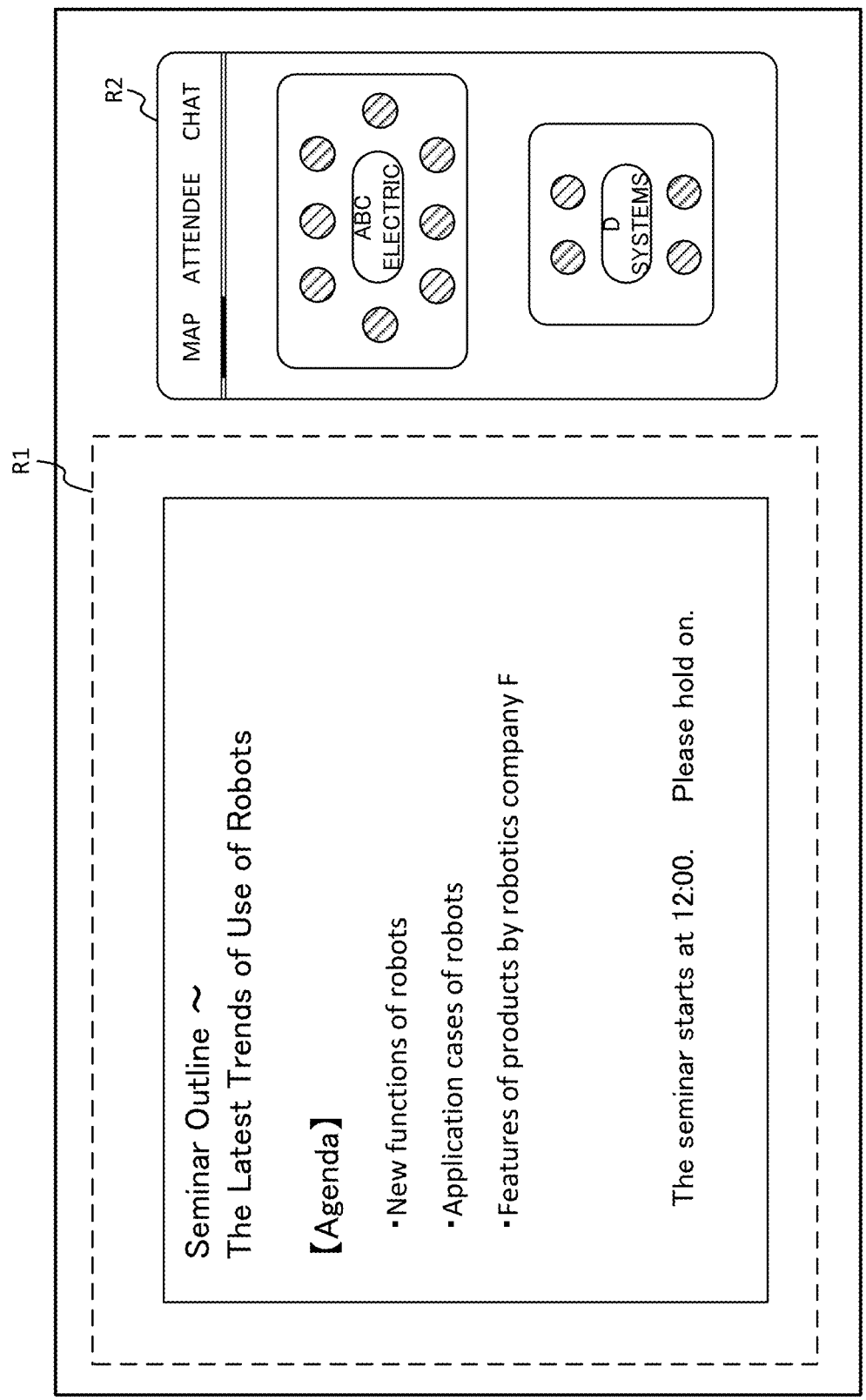
FIG. 4 shows another example of a screen in the group meeting.

FIGS. 2 to 4 show examples of screens displayed on the attendee terminal 4. FIG. 2 is a screen for selecting a group meeting that the attendee will attend. The names of exhibitor companies organizing group meetings are displayed in an area R1 of FIG. 2, as an outline of the plurality of group meetings. Specifically, the following group meetings are displayed: a group meeting of ABC electric as a booth B1; a group meeting of D systems as a booth B2; a group meeting of E communications as a booth B3; and a group meeting of F robotics as a booth B4.

An image of a circle with diagonal lines shown in each booth is an icon image corresponding to an attendee. Although the icon image in FIG. 2 is represented by diagonal lines, the icon image may be an image including information for identifying an attendee, such as a face image of the attendee.

The attendee can attend the group meeting corresponding to a selected booth by performing an operation for selecting a booth to attend on the screen of FIG. 2 (e.g., a click operation or a touch operation). FIG. 2 shows a state where the attendee has selected a group meeting of the booth B4.

Various types of information that the attendee can utilize are displayed on an area R2 of FIG. 2. Specifically, in the area R2, a list of attendees at the group meeting that the attendee is attending is displayed, a chat message exchanged with a person in charge is displayed, or a map indicating the layout of the venue is displayed. In FIG. 2, a list of attendees attending the group meeting of the booth B4 is displayed in response to the attendee selecting the group meeting of the booth B4.

If the attendee selects a display area "join" displayed on the selected booth B4 on the screen shown in FIG. 2, it is determined that the attendee is to attend the group meeting, and the attendee terminal 4 causes a screen in the group meeting to be displayed. FIG. 3 shows an example of a screen in the group meeting. Presentation materials prepared by the exhibitor company are displayed in an area R1 of FIG. 3. A screen for chatting is displayed in an area R2 of FIG. 3. The attendee can send and receive messages to and from a person in charge of the exhibitor company, using a chat screen displayed in the area R2. An operation image for switching whether to or not to send a voice or an image of the attendee may be provided in the area R1 of FIG. 3.

FIG. 4 shows another example of a screen in the group meeting. If the attendee selects a "map" in the area R2 of the screen shown in FIG. 3, the attendee terminal 4 displays the screen shown in FIG. 4. On this screen, an outline of each booth shown in the area R1 of FIG. 2 is displayed in a reduced size, and the attendee can check states of other group meetings while attending the group meeting. The attendee can shift to another group meeting by performing an operation of selecting the other group meeting displayed in the area R2.

The meeting management system S according to the present embodiment is characterized in that the attendee terminal 4 displays state data indicating a state of each group meeting so that the attendee can grasp states of group meetings that he/she is not attending. Although details of the state data will be described later, the attendee terminal 4 displays a notice informing that a presentation is coming soon in association with the group meeting, or outputs sounds of a group meeting having a lively atmosphere. The meeting management system S configured in this manner allows the attendee who is to attend the group meeting via a network to grasp states of the plurality of group meetings, and makes it easier for the attendee attending a specific group meeting to attend other group meetings.

[Outlines of the Meeting Management Apparatus 1 and the Attendee Terminal 4]

Figure 5:
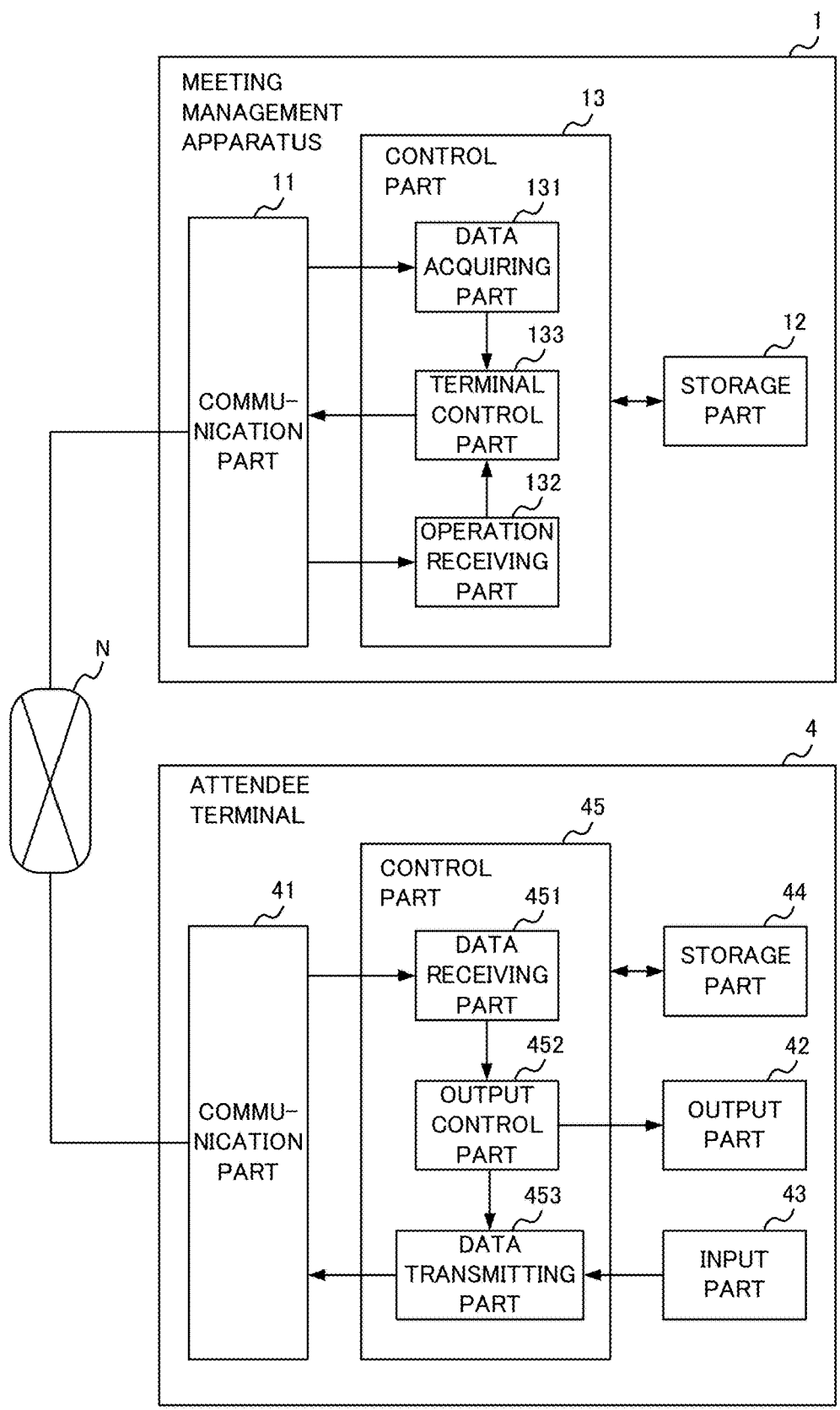
FIG. 5 shows configurations of a meeting management apparatus and an attendee terminal.

FIG. 5 shows configurations of the meeting management apparatus 1 and the attendee terminal 4. Since the exhibitor terminal 3 has a configuration equivalent to that of the attendee terminal 4, a description thereof will be omitted.

The meeting management apparatus 1 includes a communication part 11, a storage part 12, and a control part 13. The control part 13 includes a data acquiring part 131, an operation receiving part 132, and a terminal control part 133.

The communication part 11 includes a communication controller for transmitting and receiving various types of data via the network N. The communication part 11 notifies the data acquiring part 131 of image data or sound data generated in a group meeting. Further, the communication part 11 notifies the operation receiving part 132 of data for a setting operation received from the host terminal 2, the exhibitor terminal 3, or the attendee terminal 4. Furthermore, the communication part 11 transmits the image data or sound data input from the terminal control part 133, to the host terminal 2, the exhibitor terminal 3, or the attendee terminal 4.

The storage part 12 includes storage media such as a Read Only Memory (ROM), a Random Access Memory (RAM), and a Solid State Drive (SSD). The storage part 12 stores various types of data related to the group meetings. Further, the storage part 12 stores a program executed by the control part 13.

FIG. 6 shows attendee management data, which is an example of data stored in the storage part 12. In the attendee management data, a) an attendee ID, b) the name of an attendee, c) attributes of the attendee, d) an attending meeting ID for identifying the meeting that the attendee is attending, and e) state data transmission allowability are associated with each other. The attributes of the attendee are occupation, age, field of interest, or place of work, for example. The state data transmission allowability indicates whether or not it is allowed to transmit, to the attendee terminal 4, text data or sound data indicating states of group meetings that the attendee is not attending. The state data transmission allowability may be set for the text data and the sound data, respectively.

FIG. 7 shows group meeting management data, which is another example of data stored in the storage part 12. As shown in FIG. 7, the storage part 12 may store, in association with each of the plurality of group meetings, an organizer name, a schedule of the group meeting (e.g., content, a time table, or the like), and attributes. Attributes of the group meeting is information useful for the attendee to select a group meeting to attend, such as the subject matter of the group meeting, a target attendee, or an attendance fee.

Returning to FIG. 5, the control part 13 will be described. The control part 13 includes a Central Processing Unit (CPU), for example. The control part 13 functions as the data acquiring part 131, the operation receiving part 132, and the terminal control part 133 by executing a program stored in the storage part 12. Details of the data acquiring part 131, the operation receiving part 132, and the terminal control part 133 will be described later. It should be noted that the control part 13 may be referred to as a processor.

The attendee terminal 4 includes a communication part 41, an output part 42, an input part 43, a storage part 44, and a control part 45. The control part 45 includes a data receiving part 451, an output control part 452, and a data transmitting part 453.

Similar to the communication part 11, the communication part 41 includes a communication controller for transmitting and receiving various types of data via the network N. The communication part 41 receives image data and sound data transmitted from the exhibitor terminal 3 via the network N and the meeting management apparatus 1, for example. The communication part 41 inputs the received data to the data receiving part 451. Further, the communication part 41 acquires, from the data transmitting part 453, sound data based on voice input by the attendee using the attendee terminal 4 and text data input by the attendee using the attendee terminal 4, and then transmits the acquired data.

The output part 42 includes a display that functions as a display displaying various types of image data, and a speaker that outputs sound data. In response to an instruction from the output control part 452, the output part 42 displays an image related to the group meeting as shown in FIGS. 2 to 4 on the display, and outputs, from the speaker, sounds generated in the group meeting that the attendee is attending. Further, the output part 42 displays the state data notified from the output control part 452.

The input part 43 is a device that receives an operation made by the attendee using the attendee terminal 4, and is, for example, a keyboard, a mouse, or a touch panel. The input part 43 notifies the data transmitting part 453 of data based on an operation input by the attendee.

The storage part 44 includes storage media such as a ROM, a RAM, and an SSD. The storage part 44 stores a program executed by the control part 13.

The control part 45 includes a CPU, for example. The control part 45 functions as the data receiving part 451, the output control part 452, and the data transmitting part 453 by executing a program stored in the storage part 44.

The data receiving part 451 is a receiver that receives various types of data from the meeting management apparatus 1 via the communication part 41. The data receiving part 451 receives state data indicating a state of each of the plurality of group meetings, for example. The data receiving part 451 inputs the received data to the output control part 452.

The output control part 452 causes the output part 42 to output the data transmitted from the meeting management apparatus 1. The output control part 452 causes an image based on image data to be displayed on the display, and causes a speaker to output sounds based on sound data, for example. The output control part 452 causes the state data transmitted from the meeting management apparatus 1 to be displayed at a position corresponding to the group meeting according to the state data on the display (e.g., a position of a booth indicated by the meeting management apparatus 1).

The data transmitting part 453 transmits the data input by the attendee via the input part 43 to the meeting management apparatus 1. The data transmitting part 453 transmits information for identifying the group meeting selected by the attendee to the meeting management apparatus 1, for example.

[Configuration of the Control Part 13]

Next, a configuration and operation of the control part 13 will be described in detail.

The data acquiring part 131 acquires various types of data from the host terminal 2, the exhibitor terminal 3, and the attendee terminal 4 via the communication part 11. The data acquiring part 131 acquires image data for presentations from the exhibitor terminal 3, and acquires sound data indicating sounds generated by users of each terminal, from the exhibitor terminal 3 and the attendee terminal 4, for example. The data acquiring part 131 notifies the terminal control part 133 of the acquired image data and sound data.

Further, the data acquiring part 131 acquires state data indicating a state of each of the plurality of group meetings. The state data is, for example, text data (e.g., text data indicating what type of information is provided in the group meeting) indicating the state of the group meeting, image data indicating an image presented in the group meeting, or sound data indicating sounds generated in the group meeting. The data acquiring part 131 acquires, from the exhibitor terminal 3, the text data input by a person in charge of each group meeting, or the sound data input through the exhibitor terminal 3, as the state data. The data acquiring part 131 notifies the terminal control part 133 of the acquired state data.

The data acquiring part 131 may acquire, as the state data, attendee data indicating the number of attendees attending each of the plurality of group meetings. The data acquiring part 131 references the attendee management data stored in the storage part 12, and acquires the attendee data by identifying the number of attendees attending the respective group meetings, for example. The data acquiring part 131 may acquire the attendee data from the exhibitor terminal 3 used by the person in charge of each of the plurality of group meetings. Further, the data acquiring part 131 may acquire schedule data indicating a schedule of the group meeting as the state data. The data acquiring part 131 may acquire the schedule data from the exhibitor terminal 3 used by the person in charge of each of the plurality of group meetings, or may acquire the schedule data included in the group meeting management data stored in the storage part 12.

The data acquiring part 131 may further acquire attribute data indicating attributes of the attendee. For example, the data acquiring part 131 may acquire, from the host terminal 2 used by a host of an event, the attribute data in association with information for identifying the attendee, or may acquire the attribute data from the attendee terminal 4.

The operation receiving part 132 receives various operations from the attendee terminal 4 via the communication part 11. The operation receiving part 132 receives, from the attendee terminal 4, a selection operation for selecting at least one of the plurality of group meetings. The operation receiving part 132 receives an operation of selecting the group meeting by acquiring information for identifying the group meeting selected by the attendee from among the plurality of group meetings, as displayed on the screen shown in FIG. 2. The operation receiving part 132 acquires information for specifying that an operation to select a display area where "join" is displayed in the screen shown in FIG. 2 (hereinafter referred to as an "operation to join") has been performed, thereby receiving an operation to join. When receiving the operation to join, the operation receiving part 132 may update an attendee meeting ID corresponding to the attendee who performed the operation to join, in the attendee management data stored in the storage part 12.

The operation receiving part 132 may receive, from the attendee terminal 4, an operation for listening to sounds of a group meeting that the attendee using the attendee terminal 4 is not attending. The operation receiving part 132 causes the attendee terminal 4 to display an operation button such as "sound only", and if the data acquiring part 131 acquires, from the attendee terminal 4, information indicating that the attendee has selected this operation button after selecting the group meeting, the operation receiving part 132 receives an operation for listening to sounds of the selected group meeting. The operation receiving part 132 may receive the operation for listening to sounds of each of the plurality of group meetings that the attendee is not attending in an overlapping manner. The operation receiving part 132 notifies the terminal control part 133 of information indicating details of the received operation.

The terminal control part 133 transmits various types of data to the exhibitor terminal 3 and the attendee terminal 4 via the communication part 11, thereby causing various screens to be displayed on the exhibitor terminal 3 and the attendee terminal 4. The terminal control part 133 displays the screens shown in FIGS. 2 to 4 on the attendee terminal 4 by transmitting data necessary for the attendee terminal 4 to display the screens shown in FIGS. 2 to 4, for example. Then, the terminal control part 133 realizes the group meeting by relaying various types of data transmitted from the exhibitor terminal 3 and the attendee terminal 4, and allowing the exhibitor and the attendee to exchange various types of information.

Further, the terminal control part 133 transmits state data corresponding to each of the plurality of group meetings to the attendee terminal 4, in association with meeting identification information (a meeting ID) for identifying the respective plurality of group meetings. The attendee terminal 4 receiving the state data can cause a text or an image based on the state data to be displayed on a screen where images indicating the plurality of group meetings (e.g., an image that schematically shows a booth) are displayed, or can cause sounds based on the state data to be generated.

The terminal control part 133 causes text data indicating a state of each of the plurality of group meetings to be displayed at a position that is determined on the basis of a display area corresponding to the respective plurality of group meetings in the attendee terminal 4. The display area corresponding to a group meeting is an area closer to an area where information concerning this group meeting is displayed than areas where information concerning other group meetings are displayed. However, as long as the attendee can grasp which group meeting the text data corresponds to, a piece of the text data may be displayed closer to display areas corresponding to other group meetings than a display area corresponding to this group meeting.

Figure 8:
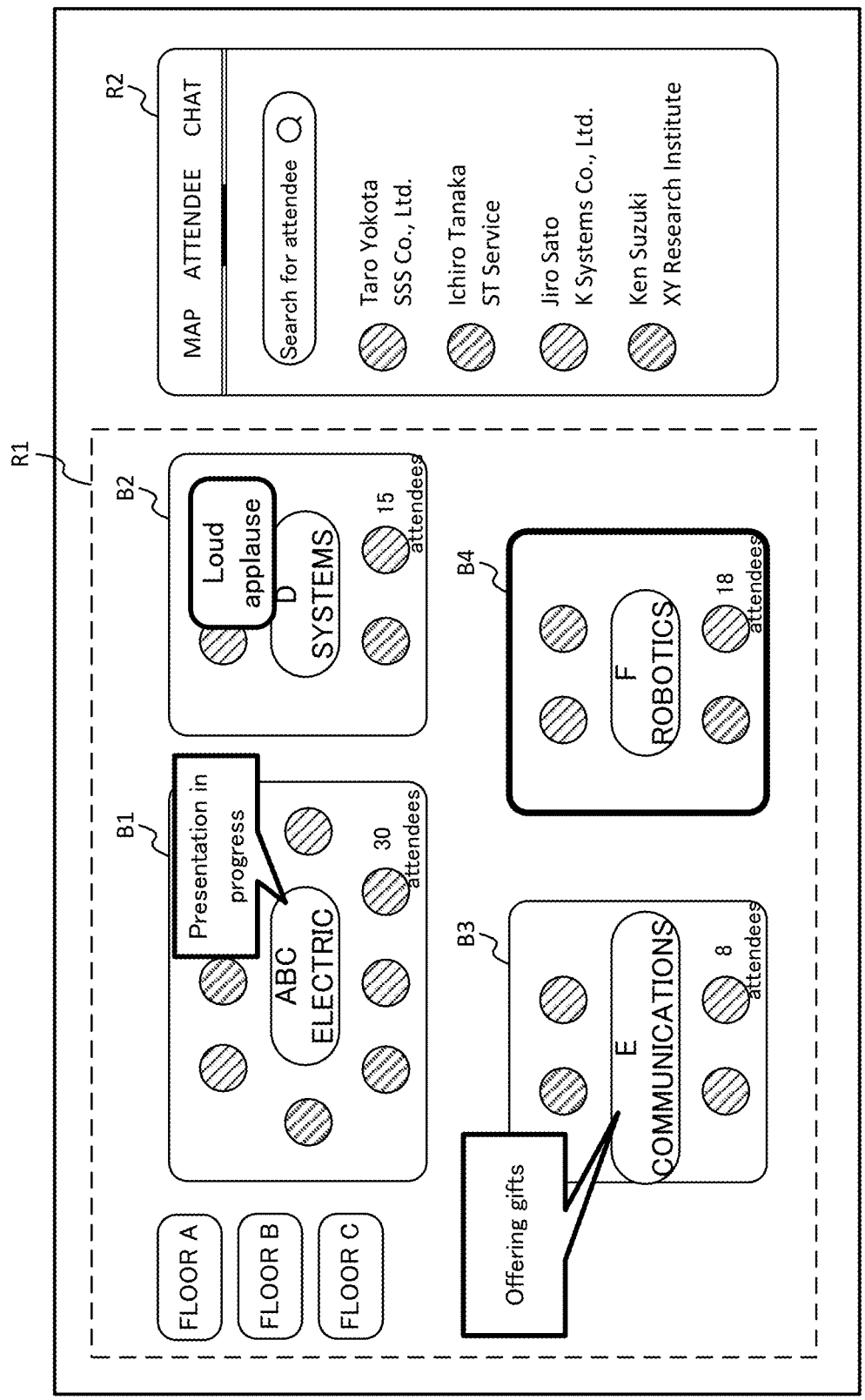
FIG. 8 shows an example of a screen where information based on state data is displayed.

FIG. 8 shows an example of a screen where information based on the state data is displayed. In the example shown in FIG. 8, "presentation in progress" is displayed at the position of the booth B1, and the attendee can understand that the presentation is being given at the booth B1. The state data may include data indicating content of the presentation, and the content of the presentation may be displayed on the screen shown in FIG. 8. At the booth B3, "offering gifts" is displayed, and the attendee can understand that he/she can get a gift when he/she attends the group meeting of the booth B3. As described above, the terminal control part 133 transmitting the state data allows the attendee to grasp the states of group meetings that the attendee is not attending so that the attendee can easily attend another group meeting.

Incidentally, when pieces of text data indicating states corresponding to the plurality of group meetings overlap, it is difficult for the attendee to grasp the content of the text data. Accordingly, the terminal control part 133 may cause a plurality of pieces of text data corresponding to the plurality of group meetings to be displayed at positions where those plurality of pieces of text data do not overlap in the attendee terminal 4. For example, the terminal control part 133 calculates the size of an area necessary for displaying the text data on the basis of the number of characters of the text data to be displayed, and identifies a position where the plurality of pieces of text data do not overlap. Since the terminal control part 133 transmits the text data together with information indicating the identified position to the attendee terminal 4, the attendee terminal 4 can display the plurality of pieces of text data in a non-overlapping manner.

If the number of pieces of text data to be displayed or the number of characters of one piece of text data to be displayed is large, the plurality of pieces of text data may overlap even though a display position is adjusted. Accordingly, the terminal control part 133 may display the plurality of pieces of text data at a timing when the plurality of pieces of text data corresponding to the plurality of group meetings do not overlap in the attendee terminal 4. For example, the terminal control part 133 determines the time at which to display the text data in the order of acquiring the text data by the data acquiring part 131, and then transmits, to the attendee terminal 4, the text data together with information indicating the determined time, thereby causing the attendee terminal 4 to display the plurality of pieces of text data at different timings.

In a display area of the booth B2 shown in FIG. 8, a text "loud applause" is displayed. In this way, in order to notify the attendee of a state where the group meeting is lively with loud applause, the terminal control part 133 may display information corresponding to the volume or content of sounds indicated by sound data at positions corresponding to the plurality of group meetings in the attendee terminal 4. In order to display information indicating the content of sounds on the attendee terminal 4, the terminal control part 133 may analyze the content of the sounds using voice recognition technology, and may transmit text data indicating the analyzed content to the attendee terminal 4.

As an example, if the sound data acquired by the data acquiring part 131 satisfies a predetermined condition, the terminal control part 133 may cause information indicating that a group meeting corresponding to the sound data is lively to be displayed. The predetermined condition is a condition indicating that the group meeting is lively, such as: the generation of sounds at a volume larger than the volume at which one person is talking; an overlap of a plurality of people's voices; or the generation of sounds indicating clapping or applause at a level indicating that the group meeting is lively.

If the attendee is attending any one of the group meetings, the terminal control part 133 may cause the attendee terminal 4 to display data indicating states of other group meetings in a map screen in the area R2 of the screen shown in FIG. 4. The terminal control part 133 causes the data indicating states of other group meetings to be displayed in the area R2 while causing data presented in the group meeting that the attendee is attending to be displayed in the area R1. Therefore, the attendee can grasp the states of other group meetings while attending the group meeting so that the attendee can shift to another group meeting on the basis of the states he/she grasped.

If the operation receiving part 132 receives, from the attendee terminal 4, an operation for listening to sounds of a group meeting that the attendee using the attendee terminal 4 is not attending, the terminal control part 133 transmits, to the attendee terminal 4, sound data of the group meeting corresponding to the operation. If a person who is not attending any of the group meetings performs an operation to only listen to sounds, the terminal control part 133 transmits, to the attendee terminal 4, sound data indicating sounds of the group meeting selected by the operation. However, the terminal control part 133 does not transmit, to the attendee terminal 4 of the attendee who only listens to sounds, image data transmitted to the attendee terminal 4 of the attendee attending the group meeting (the attendee who performed the operation to join). Further, the terminal control part 133 transmits an image of the attendee attending the group meeting (e.g., a face image of the attendee captured by the attendee terminal 4) to the attendee terminal 4 of the attendee attending the group meeting, but does not transmit, to other attendee terminals 4, an image of the attendee only listening to sounds. The terminal control part 133 operating in this manner allows the attendee, who wishes to take a look at a group meeting, to only listen to sounds easily and grasp a state of the group meeting.

If the attendee is attending one group meeting, the terminal control part 133 may transmit, to the attendee terminal 4, sound data indicating sounds of a currently-attended group meeting and sound data indicating sounds of the group meeting selected by the operation, and the terminal control part 133 may cause two kinds of sounds to be heard in an overlapping manner in the attendee terminal 4. In this case, the terminal control part 133 may cause the attendee terminal 4 to display a screen for independently adjusting each of the volume of sounds of the currently-attended group meeting and the volume of sounds of a currently-not-attended group meeting, and may change the volume of the sounds of the respective group meetings in response to the operation made by the attendee.

The terminal control part 133 may transmit, to the attendee terminal 4, sound data in which sounds of another group meeting are to be output at a lower volume than sounds of the group meeting that the attendee is attending. The terminal control part 133 transmits the sound data in which two kinds of sounds are overlapped in this manner, thereby allowing the attendee to know a state of another group meeting while attending the group meeting. Therefore, it is easier for the attendee to determine whether the attendee should shift to another group meeting.

If the operation receiving part 132 receives an operation for only listening to sounds of another group meeting while the attendee is attending one group meeting, the terminal control part 133 may temporarily stop transmitting the sound data indicating the sounds of the group meeting that the attendee is attending, and may transmit only sound data indicating the sounds of the other group meeting. The terminal control part 133 operating in this manner allows the attendee to catch sounds of other groups clearly, and therefore, it is easier for the attendee to determine whether to shift to another group meeting.

If the operation receiving part 132 receives an operation for listening to sounds of each of a plurality of group meetings that the attendee is not attending in an overlapping manner, the terminal control part 133 may transmit a plurality of pieces of sound data corresponding to sounds generated in each of the plurality of group meetings to the attendee terminal 4. At this time, the terminal control part 133 may transmit the sound data in association with a meeting ID so that the attendee can recognize which group meeting the sounds he/she hears correspond to. The attendee terminal 4 receives the sound data in association with the meeting ID, and displays an image that changes depending on the volume of the sounds indicated by the sound data in association with each group meeting, for example. Therefore, the attendee can recognize which group meeting the sounds correspond to.

The terminal control part 133 may transmit, to the attendee terminal 4, the sound data indicating the sounds of the group meetings that the attendee is not attending, on condition that the sound data acquired by the data acquiring part 131 satisfies a predetermined condition. The predetermined condition is a condition indicating that the group meeting is lively, such as: the generation of sounds at a volume larger than the volume at which one person is talking; an overlap of a plurality of people's voices; or the generation of sounds indicating clapping or applause. Since the terminal control part 133 transmits the sound data when such conditions are satisfied, the attendee can easily recognize that another group meeting is lively.

In particular, if the attendee hears sounds of another group meeting continuously when he/she is attending a group meeting, the attendee has difficulty listening to sounds of the currently-attended group meeting. However, the terminal control part 133 transmits sound data of another group meeting to the attendee terminal 4 only when the predetermined condition is satisfied, thereby allowing the attendee to understand that another group meeting is lively while listening to sounds of the currently-attended group meeting.

The terminal control part 133 may transmit, to the attendee terminal 4, sound data that satisfied the predetermined condition, and a meeting ID in association with each other so that the attendee can grasp which group meeting is lively. The terminal control part 133 transmits such data to the attendee terminal 4. Due to this, the attendee terminal 4 can display information indicating a group meeting corresponding to the transmitted meeting ID when playing sounds based on the sound data that satisfied the predetermined condition.

On condition that the sound data acquired by the data acquiring part 131 satisfies the predetermined condition, the terminal control part 133 may transmit, to the attendee terminal 4, display data for changing a display mode of a display area of the group meeting corresponding to the sound data in the attendee terminal 4. For example, the attendee terminal 4 sets the display area of the group meeting corresponding to the sound data that satisfied the predetermined condition to be displayed in a mode different from that of display areas of other group meetings. As an example, when playing sounds of a group meeting that is lively, the attendee terminal 4 can display the display area of the lively group meeting such that the attendee can distinguish the lively group meeting from other group meetings. As a result, the attendee can easily grasp which group meeting is lively.

As shown in a booth of each group meeting in FIG. 8, the terminal control part 133 may cause the attendee terminal 4 to display the number of attendees at each of the plurality of group meetings on the basis of attendee data acquired by the data acquiring part 131. Since the number of attendees at each group meeting is displayed on the attendee terminal 4, the attendee can easily determine whether or not to attend another group meeting.

Among a plurality of areas corresponding to the plurality of group meetings in the attendee terminal 4, the terminal control part 133 may cause the attendee terminal 4 to display one or more areas corresponding to one or more group meetings, which are selected on the basis of attributes of the attendee using the attendee terminal 4, in a manner (color, pattern, size, or the like) different from areas corresponding to other group meetings. The terminal control part 133 references the attendee management data and group meeting management data stored in the storage part 12, and selects a group meeting having an attribute that matches an attribute of the attendee from among the plurality of group meetings. Then, the terminal control part 133 causes the attendee terminal 4 to display the display area corresponding to the selected group meeting in such a manner that the attendee can distinguish this display area from that of the other group meetings. The terminal control part 133 operating in this manner allows the attendee to easily grasp a group meeting suitable for him/herself.

The terminal control part 133 may transmit, as state data, guide data concerning the event of the group meeting to the attendee terminal 4, on a date and time corresponding to a date and time indicated by schedule data acquired by the data acquiring part 131. For example, at a predetermined time period (e.g., 15 minutes) before a time when a predetermined event (e.g., a presentation) starts in a group meeting, the terminal control part 133 transmits state data indicating the content of the group meeting to the attendee terminal 4.

Figure 9:
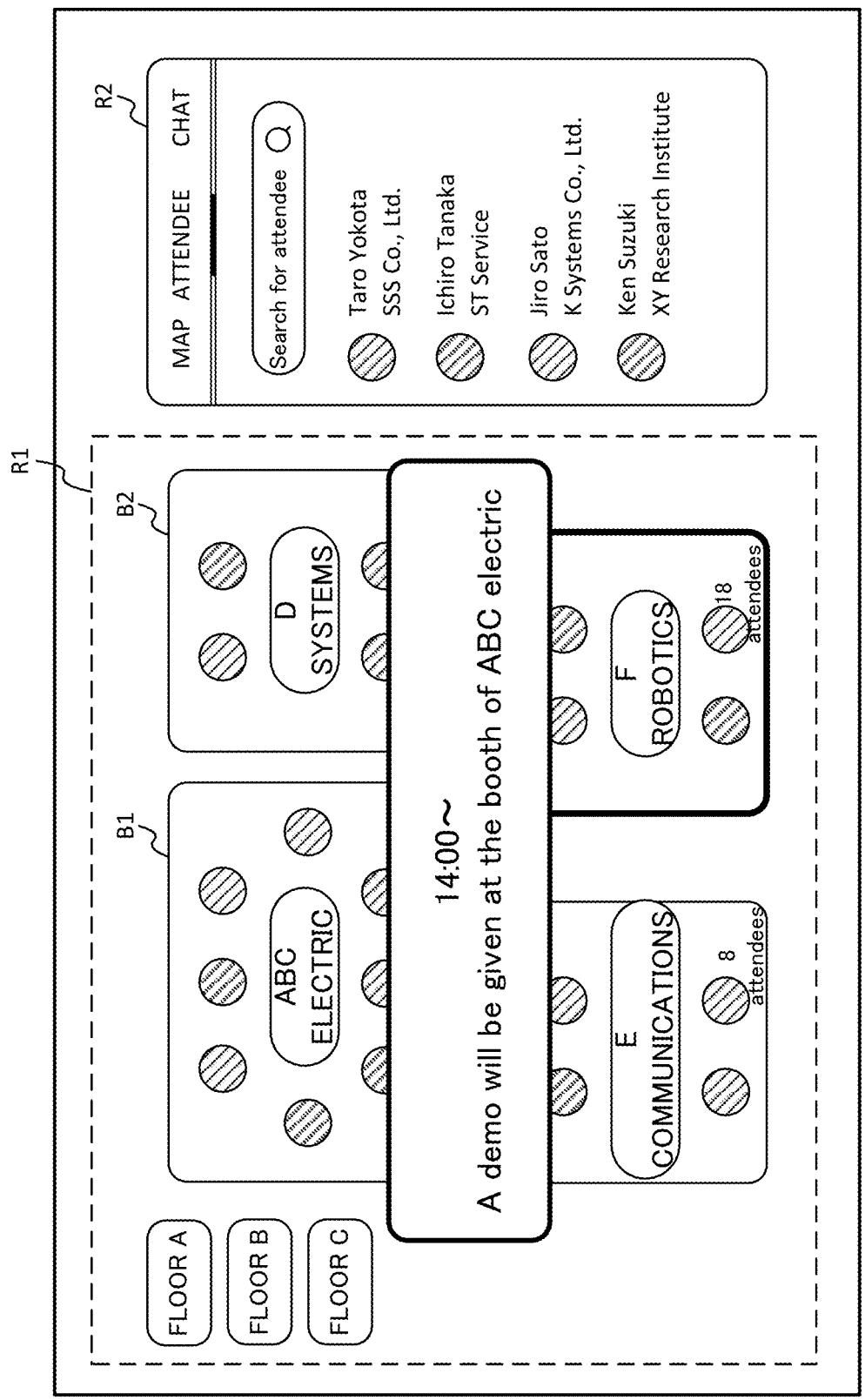
FIG. 9 shows an example of a screen where guide data is displayed.

FIG. 9 shows an example of a screen where guide data is displayed. For example, the terminal control part 133 transmits, together with text data, guide data including an instruction for causing the guide data to be displayed in an overlapping manner on display areas of the plurality of group meetings, and the attendee terminal 4 displays the guide data in the vicinity of the center of the area R1. Since the attendee terminal 4 displays such guide data, the attendee can easily attend a group meeting that he/she has not planned to attend originally.

[Flow of Processing in the Meeting Management Apparatus 1]

Figure 10:
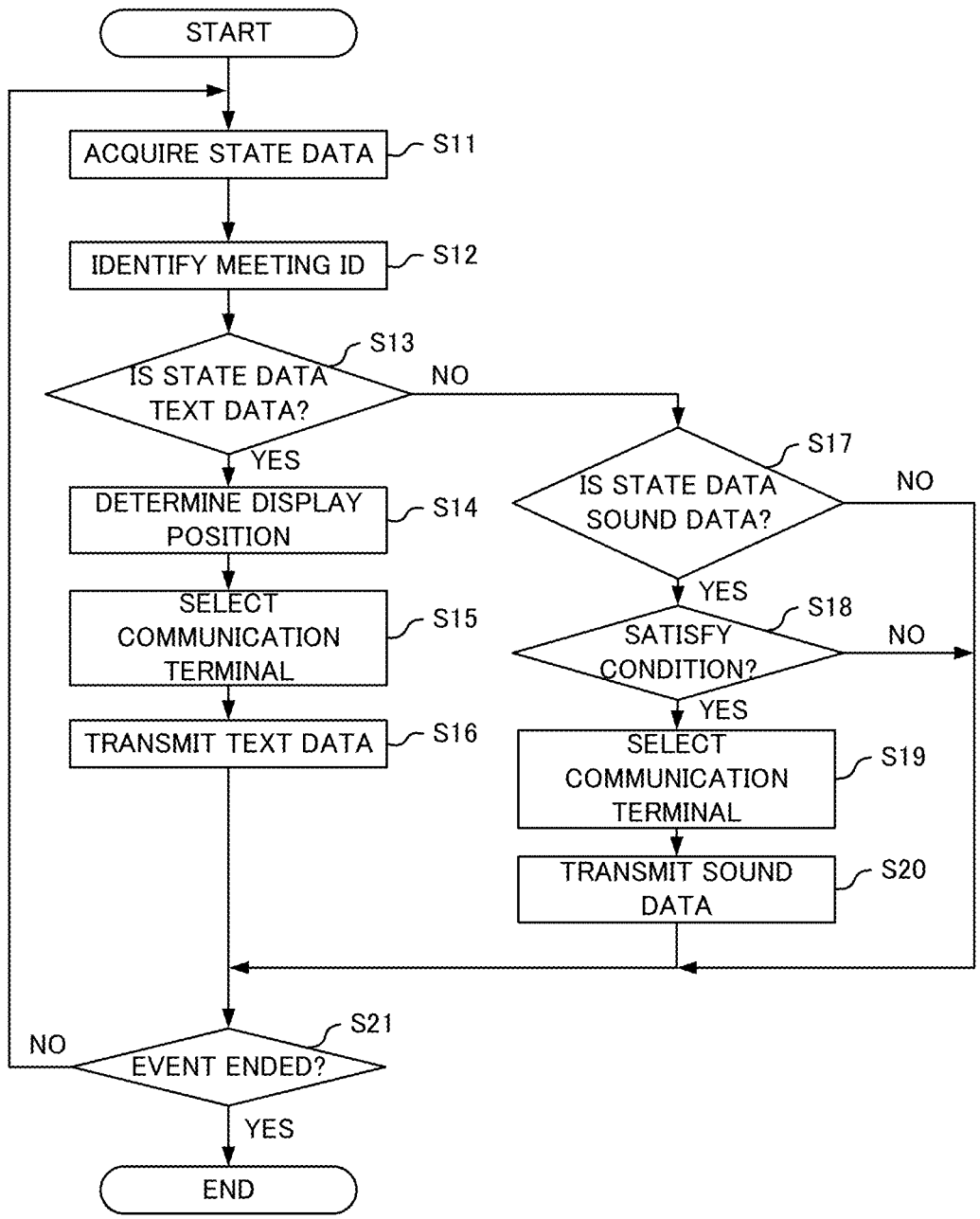
FIG. 10 is a flowchart showing an example of a flow of processing in the meeting management apparatus.

FIG. 10 is a flowchart showing an example of a flow of processing in the meeting management apparatus 1. The flowchart shown in FIG. 10 starts from when the plurality of group meetings are held.

If the data acquiring part 131 acquires the state data from any one of the exhibitor terminals 3 among the plurality of exhibitor terminals 3 (S11), the data acquiring part 131 identifies a meeting ID of the group meeting corresponding to the exhibitor terminal 3 that transmitted the acquired state data (S12), and notifies the terminal control part 133 of the state data and the meeting ID. If the terminal control part 133 determines that the state data is text data ("YES" in S13), the terminal control part 133 determines a position at which to cause the attendee terminal 4 to display the text data on the basis of the meeting ID (S14).

Next, the terminal control part 133 selects the attendee terminal 4, which is a target for transmitting the text data (S15). For example, by referencing the attendee management data stored in the storage part 12, the terminal control part 133 selects the attendee terminal 4 of the attendee who allowed transmission of the state data. The terminal control part 133 transmits the text data to the selected attendee terminal 4 (S16).

When it is determined in S13 that the state data is not text data ("NO" in S13), the terminal control part 133 determines whether or not the state data is sound data (S17). When it is determined that the sound data satisfies a predetermined condition (S18), the terminal control part 133 selects the attendee terminal 4 that is a target for transmitting the sound data (S19). The terminal control part 133 selects the attendee terminal 4 by referencing the attendee management data in a manner similar to S15, for example. The terminal control part 133 transmits the sound data to the selected attendee terminal 4 (S20). The meeting management apparatus 1 repeats the processing from S11 to S20 until a notice informing that an event is to end is received from the host terminal 2 ("NO" in S21).

MODIFIED EXAMPLE

In the above description, the meeting management apparatus 1 provides a web application to cause the exhibitor terminal 3 and the attendee terminal 4 to display screens related to a group meeting, but the configuration of the meeting management system S is not limited to this. The exhibitor terminal 3 and the attendee terminal 4 may create a screen including state data transmitted from the meeting management apparatus 1 by executing application software for displaying the screens related to the group meeting.

[Effect of the Meeting Management System S]

In the meeting management apparatus 1 as described above, the data acquiring part 131 acquires state data indicating a state of each of the plurality of group meetings, and the terminal control part 133 transmits state data corresponding to each of the plurality of group meetings to the attendee terminal 4, in association with a meeting ID for identifying each of the plurality of group meetings. Then, the attendee terminal 4 outputs text data or sound data based on the state data in association with the plurality of group meetings. The meeting management apparatus 1 and the attendee terminal 4 operating in this manner make it easier for the attendee to grasp states of the plurality of group meetings. Therefore, the attendee can attend more group meetings.

The present disclosure has been described above on the basis of the exemplary embodiments. The technical scope of the present disclosure is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

What is claimed is:

1. A meeting management apparatus managing a plurality of group meetings that a plurality of attendees can attend using a communication terminal, the meeting management apparatus comprising:
   a memory that stores meeting identification information for identifying each of the plurality of group meetings; and
   a processor configured to:
      acquire state data indicating sounds generated in each of the plurality of group meetings in association with meeting identification information;
      determine whether the state data acquired by the data acquiring part indicates an overlap of a plurality of people's voices at a level indicating that the group meeting is lively;
      transmit, to the communication terminal, the state data corresponding to each of the plurality of group meetings in association with meeting identification information for identifying each of the plurality of group meetings;
      transmit, to the communication terminal, information indicating each group meeting stored in the memory associated with meeting identification information is lively that is associated with state data indicating that the group meeting is lively; and
      cause the information indicating that the group meeting is lively to be displayed at a position corresponding to each group meeting corresponding to meeting identification information acquired in association with state data indicating that the group meeting is lively.

2. The meeting management apparatus according to claim 1, wherein
   the processor is further configured to
   acquire text data indicating a state of the group meeting as the state data, and
   cause the text data indicating the state of each of the plurality of group meetings to be displayed at a position that is determined on the basis of a display area corresponding to each of the plurality of group meetings in the communication terminal.

3. The meeting management apparatus according to claim 2, wherein
   the processor is further configured to cause a plurality of pieces of the text data corresponding to the plurality of group meetings to be displayed at positions where the plurality of pieces of text data do not overlap in the communication terminal.

4. The meeting management apparatus according to claim 2, wherein
   the processor is further configured to cause a plurality of pieces of the text data corresponding to the plurality of group meetings to be displayed at timings when the plurality of pieces of text data do not overlap in the communication terminal.

5. The meeting management apparatus according to claim 1, wherein
   the processor is further configured to cause information corresponding to volume or content of the sound indicated by the sound data to be displayed at positions corresponding to the plurality of group meetings in the communication terminal.

6. The meeting management apparatus according to claim 1, wherein
   the processor is further configured to
   receive, from the communication terminal, an operation for listening to a sound of a group meeting that the attendee is not attending,
   acquire sound data indicating a sound generated in the group meeting as the state data, and
   transmit, to the communication terminal, the sound data of a group meeting corresponding to the operation.

7. The meeting management apparatus according to claim 1, wherein
   the processor is further configured to
   acquire, as the state data, sound data indicating a sound generated in a group meeting that the attendee is not attending, and
   on condition that the sound data acquired by the processor satisfies a predetermined condition, transmit, to the communication terminal, the sound data corresponding to a sound of the group meeting that the attendee is not attending.

8. The meeting management apparatus according to claim 1, wherein
   the processor is further configured to
   acquire sound data indicating a sound generated in the group meeting as the state data, and
   on condition that the sound data acquired by the processor satisfies a predetermined condition, transmit, to the communication terminal, display data for changing a display mode of a display area of the group meeting corresponding to the sound data in the communication terminal.

9. The meeting management apparatus according to claim 1, wherein
the processor is further configured to
acquire attendee data indicating the number of attendees attending each of the plurality of group meetings as the state data, and
cause the communication terminal to display the number of attendees at each of the plurality of group meetings on the basis of the attendee data.

10. The meeting management apparatus according to claim 1, wherein
the processor is further configured to
acquire attribute data indicating an attribute of the attendee; and
among a plurality of areas corresponding to the plurality of group meetings in the communication terminal, cause the communication terminal to display one or more areas corresponding to one or more group meetings selected on the basis of an attribute of the attendee using the communication terminal, in a manner different from areas corresponding to other group meetings.

11. The meeting management apparatus according to claim 1, wherein
the processor is further configured to
acquire schedule data indicating a schedule for the group meeting, and
transmit, to the communication terminal, data concerning an event of the group meeting at a date and time corresponding to a date and time indicated by the schedule data, as the state data.

12. A meeting management method, executed by a computer, for managing a plurality of group meetings that a plurality of attendees can attend using a communication terminal, the meeting management method comprising the steps of:
acquiring state data indicating sounds generated in each of the plurality of group meetings in association with meeting identification information;
determining whether the state data acquired by the data acquiring part indicates an overlap of a plurality of people's voices at a level indicating that the group meeting is lively;
transmitting, to the communication terminal, the state data corresponding to each of the plurality of group meetings in association with meeting identification information for identifying each of the plurality of group meetings;
transmitting, to the communication terminal, information indicating each group meeting stored in a memory associated with meeting identification information is lively that is associated with state data indicating that the group meeting is lively; and
causing the information indicating that the group meeting is lively to be displayed at a position corresponding to each group meeting corresponding to meeting identification information acquired in association with state data indicating that the group meeting is lively.

13. A meeting management system comprising: a plurality of communication terminals used by a plurality of attendees; and a meeting management apparatus managing a plurality of group meetings that the attendee can attend using the communication terminal, wherein
the meeting management apparatus includes;
a memory that stores meeting identification information for identifying each of the plurality of group meetings; and
a processor configured to:
acquire state data indicating sounds generated in each of the plurality of group meetings in association with meeting identification information;
determine whether the state data acquired by the data acquiring part indicates an overlap of a plurality of people's voices at a level indicating that the group meeting is lively;
transmit, to the communication terminal, the state data corresponding to each of the plurality of group meetings in association with meeting identification information for identifying each of the plurality of group meetings,
transmit, to the communication terminal, information indicating each group meeting stored in the memory associated with meeting identification information is lively that is associated with state data indicating that the group meeting is lively; and
cause the information indicating that the group meeting is lively to be displayed at a position corresponding to each group meeting corresponding to meeting identification information acquired in association with state data indicating that the group meeting is lively; and
the communication terminal includes a processor configured to:
receive the state data; and
display the state data received by the receiving part at a position corresponding to the group meeting according to the state data.

* * * * *